(12) United States Patent
Enomoto et al.

(10) Patent No.: US 8,450,007 B2
(45) Date of Patent: May 28, 2013

(54) STACKED SECONDARY BATTERY

(75) Inventors: Shinsuke Enomoto, Sendai (JP);
Tomokazu Kumeuchi, Sendai (JP)

(73) Assignee: NEC Energy Devices, Ltd.,
Sagamihara-shi (JP)

( * ) Notice: Subject to any disclaimer, the term of this patent is extended or adjusted under 35 U.S.C. 154(b) by 390 days.

(21) Appl. No.: 12/511,254

(22) Filed: Jul. 29, 2009

(65) Prior Publication Data

US 2010/0028769 A1 Feb. 4, 2010

(30) Foreign Application Priority Data

Jul. 30, 2008 (JP) .................................. 2008-195656

(51) Int. Cl.
*H01M 6/12* (2006.01)
*H01M 10/00* (2006.01)
*H01M 2/02* (2006.01)

(52) U.S. Cl.
USPC ........... 429/162; 429/122; 429/163; 429/166; 429/167; 429/168

(58) Field of Classification Search
CPC .......... H01M 6/12; H01M 2/0275; H01M 2/30
USPC ........................ 429/162, 163, 178, 185, 120
See application file for complete search history.

(56) References Cited

U.S. PATENT DOCUMENTS

| 6,033,800 | A  | * | 3/2000 | Ichiyanagi et al. | 429/176 |
| 2005/0118500 | A1 | * | 6/2005 | Yata et al. | 429/162 |
| 2007/0111089 | A1 | * | 5/2007 | Swan | 429/160 |

FOREIGN PATENT DOCUMENTS

| JP | 2001-210358 |   | * | 8/2001 |
| JP | 2004-355915 |   | * | 12/2004 |
| JP | 2004-355915 | A |   | 12/2004 |

* cited by examiner

*Primary Examiner* — Matthew Merkling
(74) *Attorney, Agent, or Firm* — Westerman, Hattori, Daniels & Adrian, LLP

(57) ABSTRACT

A stacked secondary battery includes battery element including a multilayer structure formed by laying alternately flat plate-shaped positive electrodes and flat plate-shaped negative electrodes by way of separators, the number of the positive electrodes being larger by one than that of the negative electrodes or vice versa, and connecting positive electrode draw-out terminals of the positive electrodes to each other and also negative electrode draw-out terminals of the negative electrodes to each other, plate-shaped metal members respectively arranged on and held in contact with the opposite end surfaces of the multilayer structure as viewed in the stacking direction, binding members binding the plate-shaped metal members so as to pinch and hold the multilayer structure from the end surfaces thereof and a film casing containing the battery element pinched by and held between the plate-shaped metal members in a sealed condition.

6 Claims, 4 Drawing Sheets

STACKED SECONDARY BATTERY

CROSS REFERENCE TO RELATED APPLICATIONS

This application is based upon and claims the benefit of priority from prior Japanese Patent Application No. 2008-195656, filed Jul. 30, 2008, the entire contents of which are incorporated herein by reference.

BACKGROUND OF THE INVENTION

The present invention relates to a stacked secondary battery formed by sealing battery element including a multilayer structure prepared by laying flat plate-shaped positive electrodes and also flat plate-shaped negative electrodes one on the other by way of separators.

Lithium ion batteries are being broadly employed for portable equipment designed to be driven by a battery such as mobile phones because lithium ion batteries have a large charge/discharge capacity. Additionally, there is a large demand for high efficiency secondary batteries that can find applications in the field of electric vehicles, electric bicycles, electric tools and power storages.

Stacked batteries prepared by laying flat plate-shaped positive electrodes and flat plate-shaped negative electrodes one on the other by way of separators are broadly being employed in such high output power batteries. Positive electrodes prepared by applying lithium transition metal complex oxide particles to aluminum foil that operates as collector with an electro-conductivity providing material such as carbon black are employed in lithium ion batteries.

On the other hand, negative electrodes prepared by applying slurry of carbon particles and an electro-conductivity providing material such as carbon black to copper foil that operates as collector are employed there.

Stacked secondary batteries including lithium ion batteries are produced by covering battery element, which include a multilayer structure prepared by laying flat plate-shaped positive electrodes and flat plate-shaped negative electrodes one on the other by way of separators, by means of a film casing except an electrolyte injection port, sucking gas from the inside to produce a decompressed condition in the inside of the battery and then sealing the film casing.

The electrodes of lithium ion batteries can be deformed to degrade the efficiency of the battery as the active substance of the battery is forced to dope and undope lithium ions repeatedly in repeated charging and discharging operations.

In order to prevent positive electrodes and negative electrodes from being deformed due to repeated charging and discharging operations, for example, JP-A-2004-355915 proposes a battery comprising plate-shaped members, each of which has a metal plate at the center thereof and insulating resin arranged around the metal plate, that press from opposite sides of the battery element, which includes a battery element rolled body produced by rolling a multilayer structure of positive electrodes and negative electrodes laid one on the other by way of separators.

However, strip-shaped members including positive electrodes, negative electrodes and separators are laid sequentially one on the other in the order of separator/positive electrode or negative electrode/separator/negative electrode or positive electrode, whichever appropriate, to produce such a rolled body, which is then pressed to become flat with an outermost separator arranged as outermost peripheral member. Thus, the plate-shaped members that pinch the battery element between them contact the latter by way of the outermost separator and hence are thermally bonded to the latter only insufficiently. Documents that describe an arrangement of laying plate-shaped members one on the other as battery element are known. However, how the plate-shaped members are used to press the battery element is not clearly described there.

Therefore, it is an object of the present invention to provide a stacked secondary battery such as stacked lithium ion battery formed by laying flat plate-shaped positive electrodes and also flat plate-shaped negative electrodes one on the other by way of separators that shows a good heat radiating performance for the heat generated by charging and discharging operations and/or applied externally and is free from degradation of the charging/discharging characteristics thereof due to wrinkles produced to the separators by repeated charging and discharging operations that give rise to expansions and contractions.

SUMMARY OF THE INVENTION

According to the present invention, the above object is achieved by providing a stacked secondary battery including: battery element including a multilayer structure formed by laying alternately flat plate-shaped positive electrodes and flat plate-shaped negative electrodes by way of separators, the number of the positive electrodes being larger by one than that of the negative electrodes or vice versa, and connecting positive electrode draw-out terminals of the positive electrodes to each other and also negative electrode draw-out terminals of the negative electrodes to each other; plate-shaped metal members respectively arranged on and held in contact with the opposite end surfaces of the multilayer structure as viewed in the stacking direction; binding members binding the plate-shaped metal members so as to pinch and hold the multilayer structure from the end surfaces thereof; and a film casing containing the battery element pinched by and held between the plate-shaped metal members in a sealed condition.

Preferably, in the stacked secondary battery as defined above, the positive electrodes or the negative electrodes arranged at the respective opposite end surfaces of the multilayer structure of said battery element do not have any active substance layer formed on the surfaces thereof that are held in contact with the respective plate-shaped metal members.

Preferably, in the stacked secondary battery as defined above, the layered electrodes of a polarity whose number being smaller than that of the layered electrodes of the opposite polarity are contained respectively in the inside of pouch-like separators.

Preferably, in the stacked secondary battery as defined above, the plate-shaped metal members are made of copper or aluminum.

Since a stacked secondary battery according to the present invention includes battery element including a multilayer structure formed by laying alternately flat plate-shaped positive electrodes and flat plate-shaped negative electrodes by way of separators, the number of the positive electrodes being larger by one than that of the negative electrodes or vice versa, and connecting the positive electrode draw-out terminals of the positive electrodes to each other and also the negative electrode draw-out terminals of the negative electrodes to each other, the opposite end surfaces of the multilayer structure of the battery element shows the same electric potential level because the polarity of the electrodes having a larger number is found at the opposite end surfaces as viewed in the stacking direction thereof.

Then, as a result, it is not necessary to arrange insulating members respectively on the opposite end surfaces that show the same electric potential level so that the plate-shaped metal members can be held in tight contact respectively with the opposite end surfaces and bound by the binding members. Thus, the multilayer structure is pinched by and held between the plate-shaped metal members without requiring any insulating process.

Furthermore, the plate-shaped metal members arranged at the opposite end surfaces of the multilayer structure of the battery element provide an improved heat radiating effect so that the deformation of any of the components of the battery due to repeated charging and discharging operations is minimized to by turn improve the charging/discharging characteristics of the battery.

BRIEF DESCRIPTION OF THE DRAWINGS

The present invention will be described further with reference to the accompanying drawings, wherein like numbers reference like elements.

DESCRIPTION OF EXEMPLARY EMBODIMENTS

Figure 1A:
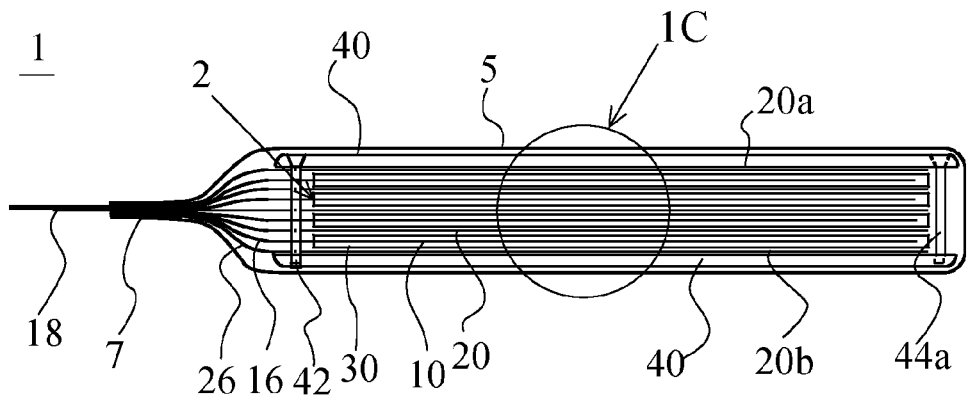
FIG. 1A is a schematic cross-sectional view of an embodiment of stacked secondary battery according to the present invention, showing the structure thereof.

According to the present invention, there is provided a stacked secondary battery such as a lithium ion battery comprising battery element including a multilayer structure formed by laying flat plate-shaped positive electrodes and flat plate-shaped negative electrodes alternately one on the other by way of separators, in which the plate-shaped positive electrodes or the plate-shaped negative electrodes arranged at the opposite ends of the multilayer structure of the battery element as viewed in the stacking direction are held to the same electric potential level, a sealed film casing containing the battery element therein, plate-shaped metal members arranged respectively on and held in tight contact with the end surfaces of the multilayer structure and binding members binding the plate-shaped metal members so as to pinch and hold the multilayer structure from the end surfaces thereof. The inventors of the present invention found that a secondary battery having such an arrangement can prevent the charging/discharging characteristics of the battery from being degraded due to expansions of the active substance layers that can be produced as charging and discharging operations are repeated and show improved thermal characteristics.

If a battery that is similar to a secondary battery according to the present invention has a multilayer structure formed by laying a number of plate-shaped positive electrodes and the same number of plate-shaped negative electrode alternately one on the other by way of separators and binding the positive electrode draw-out terminals together and also the negative electrode draw-out terminals together, a positive electrode and a negative electrode are arranged respectively at the opposite ends of the multilayer structure and hence the opposite ends show different polarities.

To the contrary, when a multilayer structure is formed by laying plate-shaped positive electrodes and plate-shaped negative electrodes alternately by way of separators in such a way that the number of the positive electrodes is larger by one than that of the negative electrodes or vice versa and the positive electrode draw-out terminals are bound together while the negative electrode draw-out terminals are bound together as in the case of a secondary battery according to the present invention, the electrodes at the opposite ends of the multilayer structure show the same polarity and the same electric potential level. The inventors of the present invention paid attention to this fact.

Thus, since the opposite end surfaces of the multilayer structure show the same electric potential level, it is not necessary to place insulating members respectively between the plate-shaped metal members arranged at the opposite ends of the multilayer structure to sandwich and hold it between them and the opposite end surfaces of the multilayer structure. Nor is it necessary to prepare the members for sandwiching and holding the multilayer structure between them partly or entirely by means of an insulating material.

Thus, metal-made members having excellent thermal characteristics can be arranged as members to be placed on the opposite end surfaces of the multilayer structure of the battery element. Additionally, a metal-made member can be used to bind the metal-made members placed on the opposite end surfaces to improve the effect of sandwiching and binding the multilayer structure of the battery element between them. Then, the characteristics of the battery are less susceptible to vibrations and impacts.

Now, the present invention will be described further by referring to the accompanying drawings.

Figure 1B:
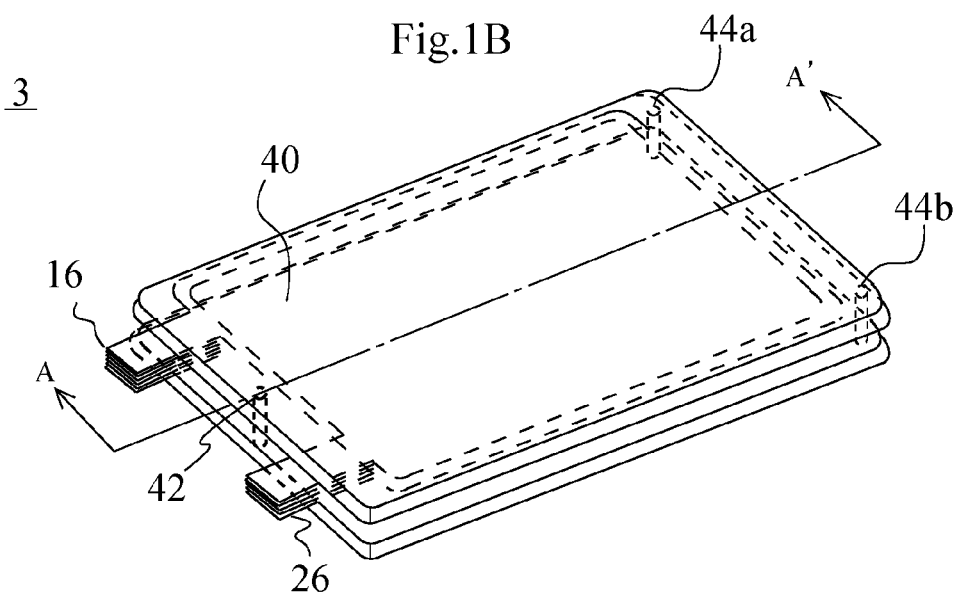
FIG. 1B is a schematic perspective view of the embodiment of FIG. 1, illustrating the battery element thereof, which include a multilayer structure pinched by and held between plate-shaped metal members
Figure 1C:
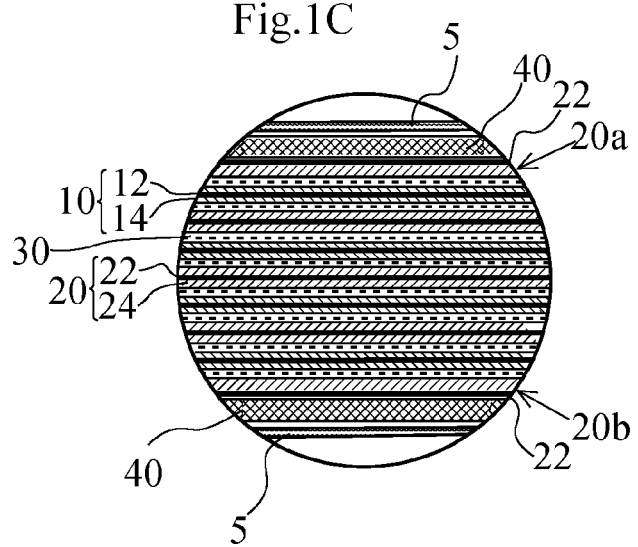
FIG. 1C is an enlarged partial view of part 1C in FIG. 1A.

FIGS. 1A through 1C schematically illustrate an embodiment of stacked secondary battery according to the present invention. FIG. 1A is a schematic cross-sectional view of the embodiment and FIG. 1B is a schematic perspective view of the embodiment, illustrating the battery element thereof including a multilayer structure sandwiched and held between plate-shaped metal members, while FIG. 1C is an enlarged partial view of part 1C in FIG. 1A.

FIG. 1A is a schematic cross-sectional view taken along line A-A' in FIG. 1B.

The stacked secondary battery 1 is typically a lithium ion battery having battery element 2 contained in a sealed film casing 5.

The battery element includes positive electrodes 10 and negative electrodes 20 laid one on the other by way of separators 30. Each of the positive electrodes 10 has a positive active substance layer 14 formed on a positive electrode collector 12 that is typically made of aluminum foil. Each of the negative electrodes 20, which has a surface area greater than each of the positive electrodes 10, has a negative electrode substance layer 24 formed on a negative electrode collector 22 that is typically made of copper foil.

In the stacked secondary battery illustrated in FIG. 1A, the number of the negative electrodes 20 is larger by one than that of the positive electrodes 10 and hence negative electrodes 20a, 20b are placed respectively at the opposite ends of the multilayer structure.

The positive electrodes 10 have respective positive electrode draw-out terminals 16, while the negative electrodes 20 have respective negative electrode draw-out terminals 26. The positive electrode draw-out terminals 16 are bonded together, while the negative electrode draw-out terminals 26 are bonded together. A positive electrode terminal 18 that is bound to the positive electrode draw-out terminals and a negative electrode terminal (not shown) are drawn out from the seal section 7 of the film casing 5.

They are drawn out to the outside and bonded to the seal section 7 of the film casing 5 as a result of thermal fusion or the like. The film casing is sealed in a decompressed internal condition after electrolyte is injected in the inside thereof and the film casing is made to tightly adhere to the battery element due to the pressure difference between the outside and the inside of the secondary battery that is produced by the decompressed condition.

As shown in FIG. 1B, plate-shaped metal members 40 are placed respectively on and tightly held in contact with the opposite end surfaces of the multilayer structure 3 of the battery element that is formed by laying positive electrodes and negative electrodes one on the other by way of separators. The plate-shaped metal members 40 are pinched and held by binding members 42, 44a, 44b that may typically include screws and are arranged at peripheral sections of the plate-shaped metal members.

When the positive electrode draw-out terminals 16 and the negative electrode draw-out terminals 26 can contact the plate-shaped metal members 40 to produce a short-circuit, insulating tapes are preferably arranged at appropriate positions on the positive electrode draw-out terminals, the negative electrode draw-out terminals and/or the plate-shaped metal members.

Preferably, a negative electrode active substance layer is formed only on the surface of each of the negative electrodes 20a, 20b arranged at the opposite ends of the multilayer structure of the battery element that is located at the side of the corresponding separator 30 as shown in FIG. 1C.

As a negative electrode active substance layer is formed only on the surface of each of the negative electrodes 20a, 20b arranged at the opposite ends that is located at the side of the corresponding separator 30 as described above, negative electrode collectors 22 that are made of copper foil are arranged respectively at the opposite ends of the multilayer structure to establish a good thermal contact between the multilayer structure of the battery element and the plate-shaped metal plates 40 arranged respectively on the opposite end surfaces of the multilayer structure to consequently improve the heat radiating effect of the battery.

Pouch-like members may be used for the separators 30 so as to cover the stacked positive electrodes or the stacked negative electrodes whose number is smaller than that of the other electrodes of the opposite polarity at the opposite surfaces and at the opposite sides thereof.

If such is the case and when each of the pouch-like members is made to have external dimensions same as those of each of the negative electrodes and equipped with a positive electrode aligning sections in the inside thereof so as to align the positive electrode at the end sections of the latter after the positive electrode is put into the pouch-like separator, it is possible to prepare a multilayer structure in which the positive electrodes and the negative electrodes are aligned with each other by laying the positive electrodes contained in the respective separators and the negative electrodes one on the other, using neighboring two sides as aligning sides.

Figure 2A:
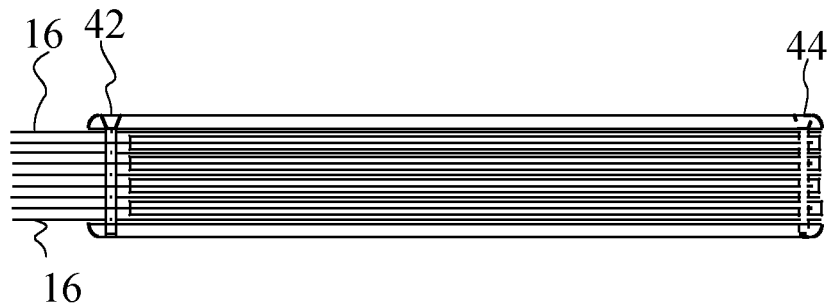
FIG. 2A is a schematic cross-sectional view of another embodiment of the present invention, showing the battery element thereof that is a multilayer structure pinched by and held between plate-shaped metal members
Figure 2B:
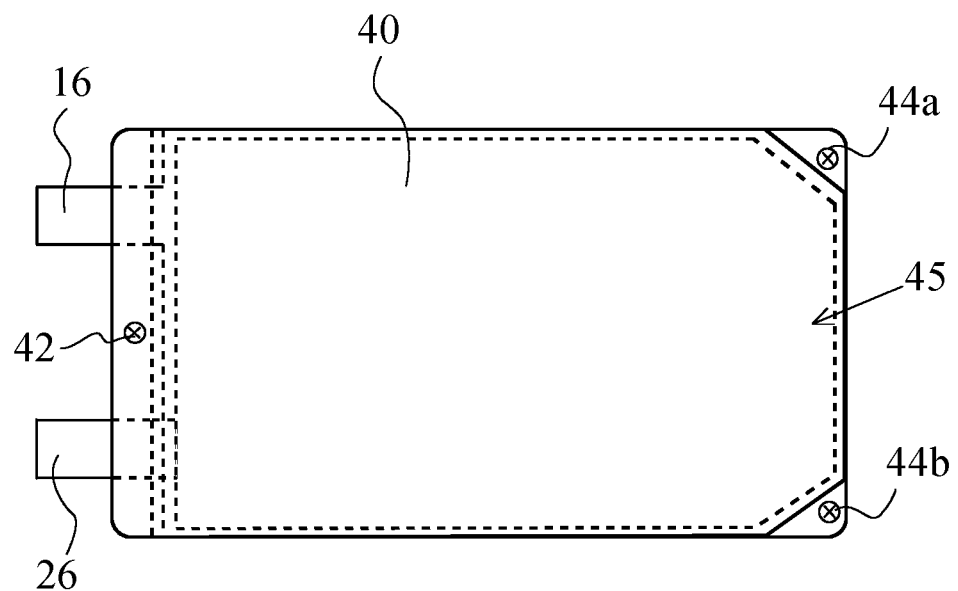
FIG. 2B is a plan view of the embodiment of FIG. 2A.

FIG. 2A is a schematic cross-sectional view of another embodiment of the present invention, showing the battery element thereof that includes a multilayer structure pinched by and held between plate-shaped metal members. FIG. 2B is a plan view of the embodiment of FIG. 2A.

In the stacked secondary battery shown in FIGS. 1A through 1C, neither the positive electrodes nor the negative electrodes are found on the projection in the stacking direction of the line connecting the centers of the binding members 44a, 44b arranged at neighboring corners of the plate-shaped metal members 40 at the opposite ends of the multilayer structure 3 of the battery element.

On the other hand, in the stacked secondary battery shown in FIGS. 2A and 2B, both the positive electrodes and the negative electrodes are found on the projection 45 in the stacking direction of the line connecting the centers of the binding members 44a, 44b, although the binding members 44a, 44b are arranged at neighboring corners of the plate-shaped metal members 40 and located at positions same as those in the stacked secondary battery shown in FIGS. 1A through 1C.

In other words, the positive electrodes and the negative electrodes can be arranged toward and close to the outer peripheral side relative to the plane connecting the centers of the binding members 44a, 44b that is perpendicular to the plane on which the components of the multilayer structure are laid one on the other. Thus, the surface area of each of the positive electrodes and the negative electrodes is reduced less in order to allow the binding members to be placed in position if compared with the embodiment of FIGS. 1A through 1C.

Figure 3A:
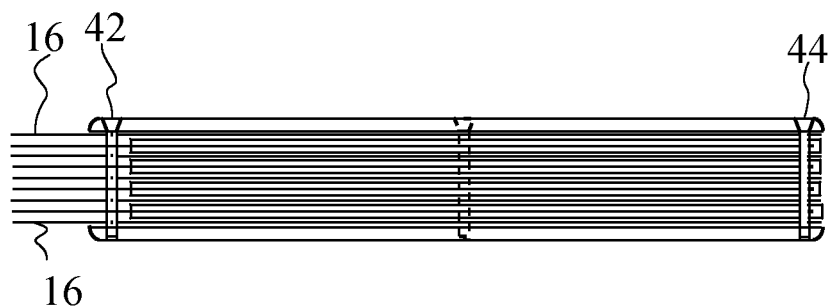
FIG. 3A is a schematic cross-sectional view of still another embodiment of the present invention, showing the battery element thereof that include a multilayer structure pinched by and held between plate-shaped metal members
Figure 3B:
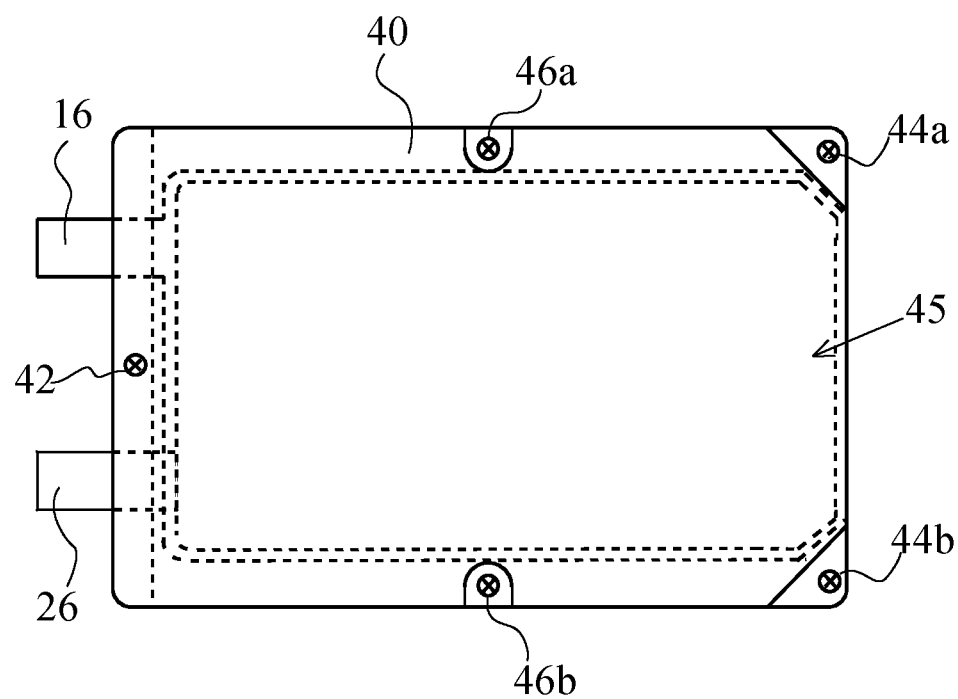
FIG. 3B is a plan view of the embodiment of FIG. 3A.

FIG. 3A is a schematic cross-sectional view of still another embodiment of the present invention, showing the battery element thereof that include a multilayer structure pinched by and held between plate-shaped metal members. FIG. 3B is a plan view of the embodiment of FIG. 3A.

As in the case of the stacked secondary battery shown in FIGS. 2A and 2B, in the stacked secondary battery shown in FIGS. 3A and 3B, both the positive electrodes and the negative electrodes are found on the projection 45 in the stacking direction of the line connecting the centers of the binding members 44a, 44b, although the binding members 44a, 44b are arranged at neighboring corners of the plate-shaped metal members 40 and located at positions same as those in the stacked secondary battery shown in FIGS. 1A through 1C.

Further, additional binding members 46a, 46b are fitted to parts of the plate-shaped metal members 40 arranged at the opposite sides of the multilayer structure in order to bind the plate-shaped metal members. More specifically, those parts are located near the lateral sides of the plate-shaped metal members 40 running in the longitudinal direction of the positive electrodes and the negative electrodes and neither any positive electrodes nor any negative electrodes are found in those parts. The positions where the additional binding members 46a, 46b are fitted are preferably near the longitudinal middle points of the lateral sides of the positive electrodes and the negative electrodes so that the battery element is pinched and held uniformly by the binding members.

When such binding members 46a, 46b are provided at outer parallel parts along the longitudinal sides of the positive electrodes and the negative electrodes, there arise parts in the longitudinal direction where neither any positive electrodes nor any negative electrodes are found for the purpose of fitting the binding members. However, the effect of pinching and holding the multilayer structure of the battery element by means of the plate-shaped metal members can be exerted very uniformly over the entire surfaces of the positive electrodes and the negative electrodes.

Figure 4:
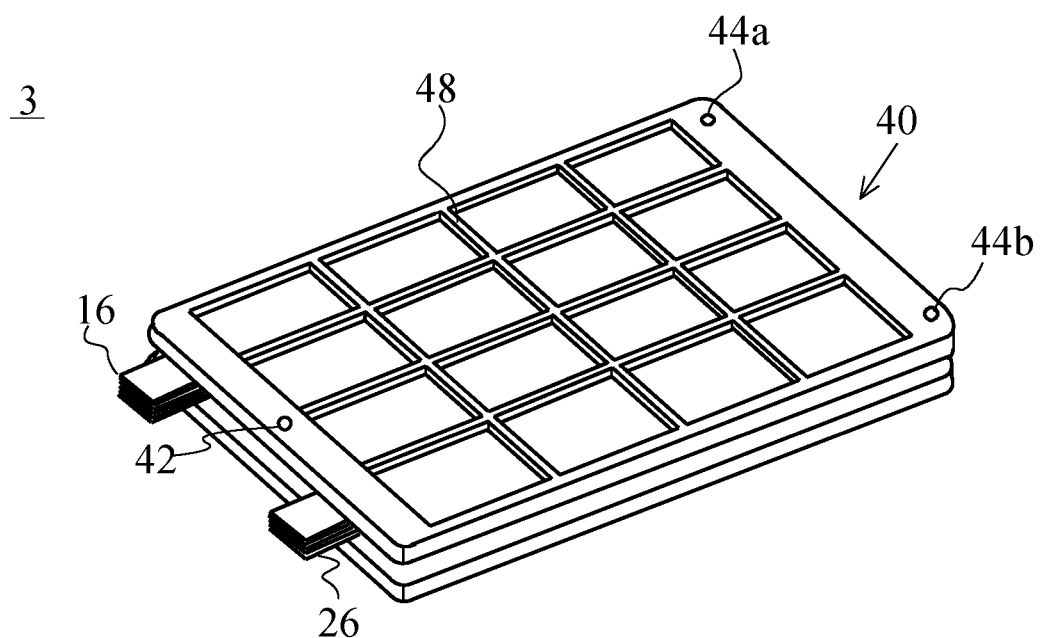
FIG. 4 is a schematic perspective view of another example of plate-shaped metal members pinching and holding a battery element between them, also illustrating the battery element pinched by and held between them.

FIG. 4 is a schematic perspective view of another example of plate-shaped metal members pinching and holding a battery element between them, also illustrating the battery element pinched by and held between them.

Each of the plate-shaped metal members 40 has a rib member 48 formed on the back side of the flat plate section that is brought into contact with a positive electrode or a negative electrode. The plate-shaped metal member 40 can show an improved rigidity if compared with plate-shaped metal member 40 having the same weight that is formed by using only a flat plate.

Then, the weight of each of the plate-shaped metal members for pinching and holding a multilayer structure can be reduced to provide an effect of reducing the weight of a stacked secondary battery.

When a stacked secondary battery is a lithium ion battery, a positive electrode active substance layer can be formed by applying slurry containing lithium manganese complex oxide, lithium cobalt complex oxide or lithium nickel complex oxide as principal ingredient to aluminum that operates as collector for each positive electrode. A negative electrode active substance layer formed by applying slurry containing carbon particles as principal ingredient to copper foil that operates as collector can be used for each negative electrode.

When the electrodes arranged at the opposite ends of the multilayer structure as viewed in the stacking direction are positive electrodes, the plate-shaped metal members for pinching and holding battery element between them may be made of aluminum or an alloy thereof. When, on the other hand, the electrodes arranged at the opposite ends are negative electrodes, the plate-shaped metal members may be made of copper or an alloy thereof.

Thus, a stacked secondary battery comprises battery element including a multilayer structure formed by laying alternately flat plate-shaped positive electrodes and flat plate-shaped negative electrodes by way of separators, the number of the positive electrodes being larger by one than that of the negative electrodes or vice versa, and connecting the positive electrode draw-out terminals of the positive electrodes to each other and also the negative electrode draw-out terminals of the negative electrodes to each other, plate-shaped metal members respectively arranged on and held in contact with the opposite end surfaces of the multilayer structure as viewed in the stacking direction, binding members binding the plate-shaped metal members so as to pinch and hold the multilayer structure from the end surfaces thereof and a film casing containing the battery element pinched by and held between the plate-shaped metal members in a sealed condition. Thus, a stacked secondary battery according to the present invention can prevent degradation of the charging/discharging characteristics thereof from taking place due to wrinkles produced to the separators by repeated charging and discharging operations that give rise to expansions and contractions of the active substance layers and improve the heat radiating performance thereof.

What is claimed is:

1. A stacked secondary battery comprising:
   battery element including a multilayer structure formed by laying alternately flat plate-shaped positive electrodes including collectors and flat plate-shaped negative electrodes including collectors by way of separators, the number of the positive electrodes being larger by one than that of the negative electrodes or vice versa, and connecting positive electrode draw-out terminals of the positive electrodes to each other and also negative electrode draw-out terminals of the negative electrodes to each other;
   plate-shaped metal members comprising a flat plate portion and a rib member formed on a back side of the flat plate portion, the plate-shaped metal members being respectively arranged on and held in contact with the opposite end surfaces of the multilayer structure as viewed in the stacking direction, plate-shaped metal members being respectively held in direct contact with and electrically connected to, in stacking direction, both end surfaces of the multilayer structure, the both end surfaces having the same polarity, and the plate-shaped metal members being formed of the same material as that of the collectors of the electrodes positioned outermost of the multilayer structure;
   binding members binding the plate-shaped metal members so as to pinch and hold the multilayer structure from the end surfaces thereof; and
   a film casing containing the battery element pinched by and held between the plate-shaped metal members in a sealed condition.

2. The secondary battery according to claim 1, wherein the positive electrodes or the negative electrodes arranged at the respective opposite end surfaces of the multilayer structure of said battery element do not have any active substance layer formed on the surfaces thereof that are held in contact with the respective plate-shaped metal members.

3. The stacked secondary battery according to claim 1, wherein the layered electrodes of a polarity whose number being smaller than that of the layered electrodes of the opposite polarity are contained respectively in the inside of pouch-shaped separators.

4. The stacked secondary battery according to claim 2, wherein the layered electrodes of a polarity whose number being smaller than that of the layered electrodes of the opposite polarity are contained respectively in the inside of pouch-shaped separators.

5. The stacked secondary battery according to claim 1, wherein the plate-shaped metal members are made of copper or aluminum.

6. The stacked secondary battery according to claim 2, wherein the plate-shaped metal members are made of copper or aluminum.

* * * * *